United States Patent
Kurose et al.

(10) Patent No.: US 6,687,221 B1
(45) Date of Patent: *Feb. 3, 2004

(54) COMMUNICATION MANAGEMENT CONTROL SYSTEM, COMMUNICATION CONTROL UNIT THEREFOR AND COMPUTER PROGRAM PRODUCT

(75) Inventors: Osamu Kurose, Tokyo (JP); Kazuaki Yada, Tokyo (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,199

(22) Filed: Dec. 19, 1997

(30) Foreign Application Priority Data

Feb. 21, 1997 (JP) .............................. 9-037445

(51) Int. Cl.$^7$ ........................... G01R 31/08; H04L 12/28
(52) U.S. Cl. ...................... 370/230; 370/401; 709/105
(58) Field of Search ................... 370/403, 401, 370/420, 465, 355, 230, 402; 379/219, 221, 112, 118; 709/223, 224, 225, 226, 300, 302, 1, 2, 105

(56) References Cited

U.S. PATENT DOCUMENTS

| 5,337,311 A | | 8/1994 | Herzberg et al. |
| 5,546,540 A | * | 8/1996 | White ..................... 395/200.1 |
| 5,590,288 A | * | 12/1996 | Castor et al. .......... 395/200.03 |
| 5,742,845 A | * | 4/1998 | Wagner ...................... 395/831 |
| 5,781,735 A | * | 7/1998 | Southard ............... 395/200.54 |
| 5,915,095 A | * | 6/1999 | Miskowiec ............ 395/200.53 |
| 5,968,124 A | * | 10/1999 | Takahashi ................... 709/224 |

FOREIGN PATENT DOCUMENTS

| JP | 6-237260 | 8/1994 |
| JP | 06244839 | 9/1994 |

* cited by examiner

Primary Examiner—Duc Ho
(74) Attorney, Agent, or Firm—Staas & Halsey LLP

(57) ABSTRACT

A communication management control system manages exchange of data between an external information processing unit and an internal information processing unit via a router. The communication management control system includes a first local area network (LAN) coupled to the internal information processing unit, a second local area network (LAN) coupled to the router, and a communication control unit coupled to the first LAN and the second LAN.

12 Claims, 10 Drawing Sheets

F I G. 1
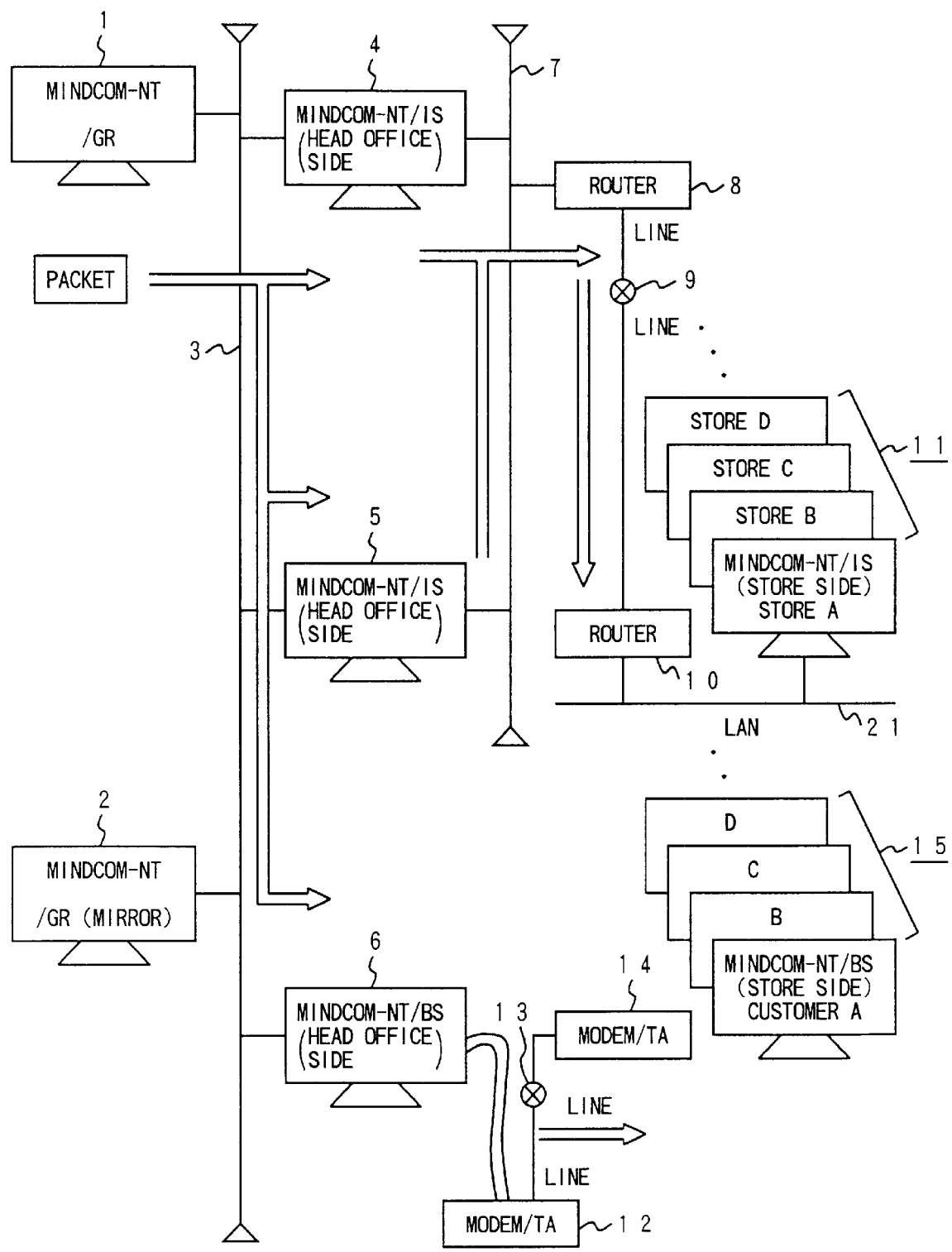

FIG. 2(a)

| NUMBER OF CONNECTED TERMINALS (IS) | LINE TASK TRANSMISSION PROCEDURE USED  ×12<br>0:FOR PROCEDURE  1:TCP/IP  2:BSC | EXISTENCE OF MIRROR | | | ... |
|---|---|---|---|---|---|

FIG. 2(b)

| LINE GROUP CODE | TRANSMISSION PROCEDURE | NUMBER OF TERMINALS USED IN UNITS OF LINE GROUP | NUMBER OF LINES USED IN UNITS OF LINE GROUP | | | |
|---|---|---|---|---|---|---|
| ⋮ | | | | | | |

FIG. 2(c)

| TERMINAL CODE | IP ADDRESS | TEL NUMBER | JCA INFORMATION CENTER CODE, STATION CODE, ETC. | | | |
|---|---|---|---|---|---|---|
| ⋮ | | | | | | |

FIG. 2(d)

| TERMINAL GROUP CODE | TERMINAL CODE | |
|---|---|---|
| ⋮ | | |

FIG. 2(e)

| SCHEDULE NUMBER | SCHEDULE TYPE | START-END TIME OF SCHEDULE | TERMINAL GROUP CODE | LINE GROUP CODE | NUMBER OF LINES USED IN UNITS OF SCHEDULE | DATA TYPE CODE | | |
|---|---|---|---|---|---|---|---|---|
| ⋮ | | | | | | | | |

FIG. 2(f)

| DATA TYPE CODE | DATA FORMAT 0:TEXT FORMAT  1:BINARY FORMAT | DISTRIBUTION FILE NAME | GR MAIN COMMON NAME | GR MIRROR COMMON NAME | | |
|---|---|---|---|---|---|---|
| ⋮ | | | | | | |

FIG. 2(g)

| CLASSIFICATION 0:HOST  1:TERMINAL | EXISTENCE OF MIRROR | GR MAIN IP ADDRESS | GR MIRROR IP ADDRESS | HOST IS INFORMATION | TERMINAL IS INFORMATION | |
|---|---|---|---|---|---|---|

F I G. 3
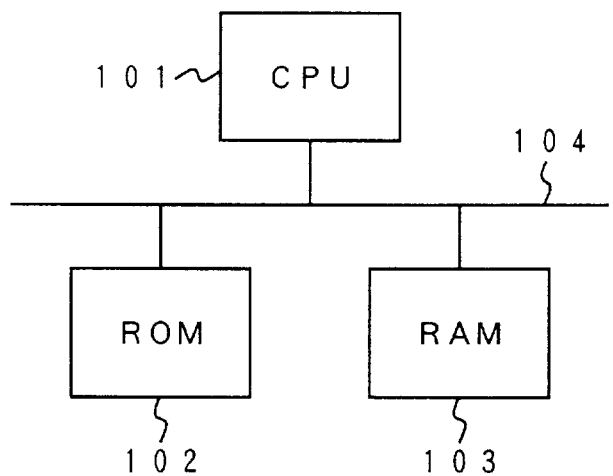
F I G. 4
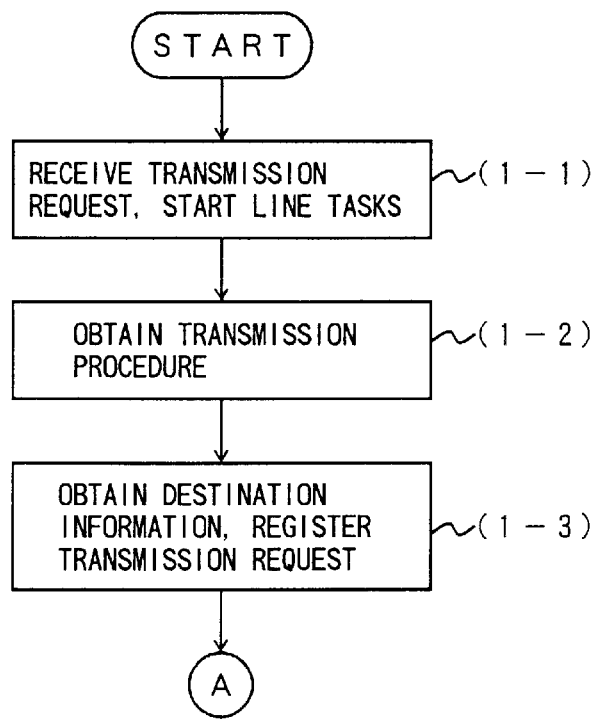

F I G. 1 2 (a)

| NUMBER OF ISs NUMBER OF HEAD OFFICE ISs OF LINE GROUP TO WHICH STORE BELONGS | IS INFORMATION | | ×12 |
|---|---|---|---|
| | IS NUMBER (1~12) | IP ADDRESS (IP ADDRESS OF HEAD OFFICE IS) | |
| | | | |

F I G. 1 2 (b)

| SEQUENCE NUMBER | DISTRIBUTION CLASSIFICATION | TERMINAL CODE | DATA TYPE | DISTRIBUTION FILE SIZE | RESULT CODE | |
|---|---|---|---|---|---|---|
| | | | | | | |

COMMUNICATION MANAGEMENT CONTROL SYSTEM, COMMUNICATION CONTROL UNIT THEREFOR AND COMPUTER PROGRAM PRODUCT

BACKGROUND OF THE INVENTION

The present invention generally relates to communication management control systems, communication control units therefor and computer program products, and more particularly, to a communication management control system, a communication control unit and a computer program product which manage exchanges of data with a plurality of terminals.

Conventionally, sales data and the like of a plurality of stores are stored and managed by a communication control unit such as a server and a host unit, using a local area network (LAN), a public line or a leased line which connects to the stores. In this case, a terminal is provided at each of the plurality of stores, which may be located at distant locations, and the communication control unit is coupled to the terminals via the LAN, the public line or the leased line. The sales data and the like are exchanged between the communication control unit and the terminals.

However, when the communication control unit is set up at a certain location and is coupled via the public line or the like to the terminals of the plurality of stores which are located at the distant locations so as to exchange data, it is not easy to connect a terminal of a new store depending on the processing capability of the communication control unit. If the processing capability of the communication control unit is insufficient to support the connection of an additional terminal, it is necessary to greatly modify the construction of the communication control unit so as to increase the processing capability thereof. Furthermore, if it is impossible to modify the construction of the communication control unit so as to obtain a sufficiently large processing capability that can support the connection of the additional terminal, it is necessary to replace the communication control unit with a new communication control unit which has the sufficiently large processing capability. In addition, the cost of the communication control unit and the communication management control system which includes the communication control unit increases when the communication control unit is modified or is replaced by the new communication control unit having the larger processing capability.

Therefore, there are problems in that the conventional communication control unit cannot flexibly cope, at a low cost, with an increase in the number of terminals which are coupled to the communication control unit. As a result, the communication control unit and the communication management control system can not provide high-speed processing when the number of terminals increases.

SUMMARY OF THE INVENTION

It is a general object of the present invention to provide a novel and useful communication management control system, a communication control unit therefor and computer program product, in which the problems described above are eliminated.

Another and more specific object of the present invention is to provide a communication management control system, a communication control unit therefor and a computer program product, which can flexibly cope, at a low cost, with increases in the number of terminals and the amount of data processing within the communication management control system.

Still another object of the present invention is to provide a communication management control system which manages exchange of data between an external information processing unit and an internal information processing unit via a router, comprising a first local area network (LAN) coupled to the internal information processing unit, a second local area network (LAN) coupled to the router, and a communication control unit coupled to the first LAN and the second LAN. According to the communication management control system of the present invention, it is possible to flexibly cope with changing conditions, such as increased in the number of terminals or the amount of data processing, at a low cost. Hence, even if a failure is generated in one or more units within the communication management control system, it is possible to continue the communication process by a unit which is operating normally.

A further object of the present invention is to provide a communication control unit which exchanges data between an external information processing unit and an internal information processing unit via a router, where the internal information processing unit is provided within a communication management control system having a first local area network (LAN) and a second local area network (LAN), and the communication control unit comprises means for coupling the communication control unit to the internal information processing unit and the first LAN, and means for coupling the communication control unit to the second LAN which is coupled to the router. According to the communication control unit of the present invention, it is possible to flexibly cope with changing conditions, such as increased in the number of terminals or the amount of data processing within the communication management control system, at a low cost. Hence, even if a failure is generated in one or more units within the communication management control system, it is possible to continue the communication process by a unit which is operating normally.

Another object of the present invention is to provide a computer program product which stores a program for causing a computer to exchange data between an external information processing unit and an internal information processing unit via a router, the internal information processing unit being provided within a communication management control system having a first local area network (LAN) and a second local area network (LAN), comprising means for making the computer to couple the computer to the internal information processing unit and the first LAN, and means for making the computer to couple the computer to the second LAN which is coupled to the router. According to the computer program product of the present invention, it is possible to flexibly cope with changing conditions, such as the number of terminals or the amount of data processing within the communication management control system, at a low cost. Hence, even if a failure is generated in one or more units within the communication management control system, it is possible to continue the communication process by a unit which is operating normally.

Other objects and further features of the present invention will be apparent from the following detailed description when read in conjunction with the accompanying drawings.

BRIEF DESCRIPTION OF THE DRAWINGS

FIG. 1 is a system block diagram showing a first embodiment of a communication management control system including communication control units, computers and terminals according to a first embodiment of the Present invention;

FIGS. 2(a) through 2(g) respectively are diagrams showing embodiments of tables used in the first embodiment;

FIG. 3 is a system block diagram showing the construction of a computer which may be used as any of the communication control units, computers and terminals shown in FIG. 1;

FIG. 4 is a flow chart for explaining the operation of the communication control unit when registering a transmission request;

FIGS. 12(a) and 12(b) respectively are diagrams showing embodiments of tables used in the second embodiment;

DESCRIPTION OF THE PREFERRED EMBODIMENTS

Figure 5:
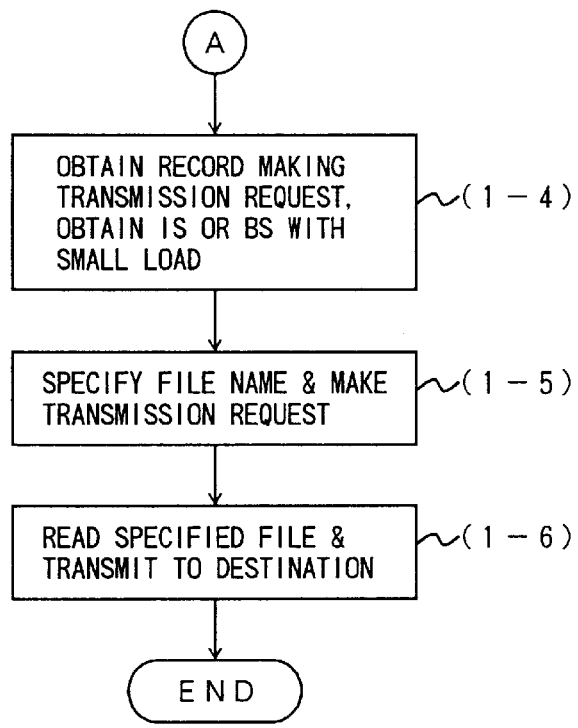
FIG. 5 is a flow chart for explaining the operation of the communication control unit when making a transmission in response to a transmission request.

FIG. 1 shows a first embodiment of a communication management control system according to the present invention. This embodiment of the communication management control system employs a first embodiment of a communication control unit according to the present invention.

In FIG. 1, a communication control unit (MINDCOM-NT/GR) 1 is formed by a computer which is installed with WINDOWS NT operating system (OS). This communication control unit 1 is provided in a working or main system, and manages the communication control which will be described later. On the other hand, a communication control unit (MINDCOM-NT/GR(mirror)) 2 is formed by a computer which is installed with the WINDOWS NT. This communication control unit 2 is provided in a backup or sub system, and continues to manage the communication control when a failure is generated in an operating system (OS) or hardware of the communication control unit 1 of the main system. The sub system is sometimes also referred to as a hot standby system. The communication control unit 2 (mirror GR) has the same functions as the communication control unit 1 (GR). The communication control includes management of the exchange of data between the communication control unit 1 or 2 and a plurality of terminals which will be described later.

A first LAN 3 is used to provide a data processing service by connecting the communication control units 1 and 2 and computers 4, 5 and 6 which will be described later. For example, a high-speed communication LAN such as 10BaseT and 100BaseT is used as the first LAN 3.

The computers (MINDCOM-NT/IS) 4 and 5 are formed by inexpensive personal computers which are installed with the WINDOWS NT, and are provided at a head office. These computers 4 and 5 actually exchange data with terminals 11 via a second LAN 7, a router 8, a network 9, a router 10 and a LAN 21, in response to communication requests from the communication control units 1 and 2, by referring to a table based on a destination terminal ID within the data or depending on an attribute of the destination terminal ID within the data. The second LAN 7 is used to provide a communication service. The number of computers 4 and 5 is increased arbitrarily depending on the number of the terminals 11 provided at stores A, B, C, D, . . . , so as to cope with the load and to provide a sufficient processing capability.

The computer (MINDCOM-NT/BS) 6 is formed by an inexpensive personal computer which is installed with the WINDOWS NT, and is provided at the head office. This computer 6 actually exchanges data with terminals 15 via a modem/terminal adapter (TA) 12, a network 13 and a modem/TA 14, in response to communication requests from the communication control units 1 and 2, by referring to a table based on a destination terminal ID within the data or depending on an attribute of the destination terminal ID within the data. The number of computers 6 is increased arbitrarily depending on the number of terminals 15 provided at the stores A, B, C, D, . . . , so as to cope with the load and to provide a sufficient processing capability.

At least one terminal 11 or 15 is provided at each of the stores A, B, C, D, . . . The terminal 11 in a store communicates with the computer 4 or 5 via the router 10 using TCP/IP. On the other hand, the terminals 15 are not coupled to the same LAN, but are provided at remote locations. Hence, if N terminals 15 are provided, a 1:N simultaneous multiplexed communication is made between the computer and the N terminals 15 via the modem/TA 14, the network 13 and the modem/TA 12.

The computers 4, 5 and 6 respectively have the functions of a communication control unit. In addition, a buffer is provided in the computers 4, 5 and 6 so as to temporarily store the received data. The data stored in the buffer are transmitted when a predetermined amount of data is stored or, when a predetermined time elapses. The data received by the computers 4, 5 and 6 may be divided into predetermined amounts and successively transmitted in divisions.

Of course, the functions of the computer 6 may be included in the functions of the computers 4 and 5 or, the functions of the computers 4 and 5 may be included in the functions of the computer 6. In FIG. 1, the three computers 4, 5 and 6 are shown so as to facilitate the understanding of the functions of the computers.

In this embodiment, the terminals 11 and 15 provided at the stores A, B, C, D, . . . are point-of-sales (POS) terminals which can input and transmit sales data and carry out various business processes. For example, the POS terminals are computers (MINDCOM-NT/BS) installed with WINDOWS NT, and exchange data with the communication control units 1 and 2. "MINDCOM-NT" denotes a computer which may be used as a GR, IS or BS.

Next, a description will be given of the operation of the communication management control system shown in FIG. 1, by referring to FIGS. 2(a) through 2(g) respectively showing tables used in this embodiment. In the following description, "GR" refers to the communication control unit 1 during a normal operation or the communication control unit 2 when a failure is generated in the communication control unit 1, and "mirror GR" refers to the communication control unit 2. In addition, "IS" refers to the computers 4 and 5, and "BS" refers to the computer 6.

In addition, a reference to the tables shown in FIGS. 2(*a*) through 2(*g*) is made in the following manner. For example, "a GR system table shown in FIG. 2(*a*)" refers to a GR system table shown in FIG. 2(*a*) of the communication control unit 1 during the normal operation or the communication control unit 2 when a failure is generated in the communication control unit 1.

FIG. 3 shows the construction of a computer which may be used as any of the communication control units 1 and 2, the computers 4 through 6, and the terminals 11 and 15. As shown in FIG. 3, the computer includes a central processing unit (CPU) 101, a read only memory (ROM) 102 and a random access memory (RAM) 103 which are coupled by a bus 104. The ROM 102 and the RAM 103 may be realized by suitable storage devices or units, such as semiconductor memory devices, and disk units for magnetic, optical or magneto-optic disks. The ROM 102 stores programs which are executed by the CPU 101, and the RAM 103 stores data such as intermediate data obtained during calculations performed by the CPU 101. The buffer described above provided in the computers 4, 5 and 5 for temporarily storing the received data may be formed by the RAM 103.

A computer program product according to the present invention is made up of any kind of storage medium, unit or device capable of storing electronic information including programs for making the computer shown in FIG. 3, particularly, the CPU 101, carry out the operation of the communication management control system or the communication control unit, according to the present invention as described in this specification.

(1) The operation of the GR includes the following basic steps (1-1) through (1-7) when the GR is realized by the computer shown in FIG. 3. The processes of the steps (1-1) through (1-7) are carried out by the CPU 101.

Figure 6:
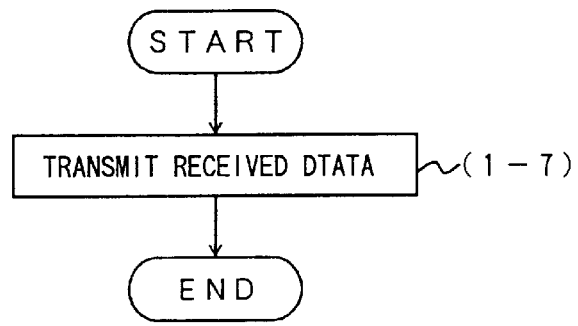
FIG. 6 is a flow chart for explaining the operation of the communication control unit when receiving data.

FIG. 4 is a flow chart for explaining the operation of the GR when registering a transmission request, and FIG. 5 is a flow chart for explaining the operation of the GR when making a transmission in response to the transmission request. In addition, FIG. 6 is a flow chart for explaining the operation of the GR when receiving data.

Step (1-1), FIG. 4: A transmission request is received from a host unit or the like via the first LAN 3, and a reference is made to a GR system table shown in FIG. 2(*a*), so as to start a required number of line tasks for each of the ISs and BS. If a mirror GR (communication control unit 2) exists, the GR periodically communicates with the mirror GR to notify the state of the GR.

Step (1-2), FIG. 4: With respect to data for which a transmission request is received from a processing unit such as a host unit, the GR makes a reference to a GR line attribute table shown in FIG. 2(*b*), so as to judge whether the transmission procedure is TCP/IP or BSC. The GR distributes the judged transmission procedure to the IS or BS.

Step (1-3), FIG. 4: The GR further makes a reference to a GR terminal attribute table shown in FIG. 2(*c*), so as to obtain a terminal code (terminal ID) of a destination set in the data, an IP address in the case of the IS, and a telephone number and JCA information (center code which indicates the computer (center) 6, station code which indicates the terminal (station) 15, and the like) in the case of the BS. The GR sends the obtained information to the corresponding IS or BS on the head office side (hereinafter referred to as the head office IS or BS). The transmission request is registered in a GR common schedule table shown in FIG. 2(*e*).

Step (1-4), FIG. 5: When making a transmission (or reception) request to the head office ISs and the head office BS, the GR makes a reference to the GR common schedule table shown in FIG. 2(*e*), so as to obtain a number of lines used, more particularly, the record making the transmission request to the head office IS or BS. In addition, out of the ISs and BS corresponding to the number of lines used, the GR obtains the IS or BS with a small load. The GR communicates with the ISs or BS, and distributes the transmission (or reception) request to the IS or BS with the small load. When the communication is periodically made between the GR and the ISs or BS to confirm their existence, load information related to the load of the ISs or BS is transmitted to the GR, and the GR can recognize the load of each IS or BS from this load information.

Step (1-5), FIG. 5: When making the judgement described above, the GR transmits to the head office IS or BS a transmission (or reception) request which includes a file name of the file to be transmitted, depending on a data type of the data for which the transmission request is received from a host unit or the like which is not shown in FIG. 1. For example, the data type is "master maintenance" which is a kind of file generally used in a POS system or the like.

Step (1-6), FIG. 5: When making the transmission in the step (1-5), the GR reads the file which is specified by the file name. In addition, with respect to a terminal group specified by the GR common schedule table shown in FIG. 2(*e*), the GR makes a reference to a GR terminal group table shown in FIG. 2(*d*), so as to obtain an attached terminal code (terminal ID) of all of the defined terminal codes (terminal IDs).

Step (1-7), FIG. 6: When making the reception, the GR transmits the data received from the IS or BS to the host unit, data server or the like which are not shown in FIG. 1.

Therefore, with respect to the data for which the transmission request from the host unit or the like which are not shown in FIG. 1 is received by the GR, the load is distributed with respect to all terminals belonging to the terminal group which is specified within the data, so as to make the transmission request with respect to the IS or BS using a small number of lines. Hence, when the number of lines used by the IS or BS becomes too large, thereby making the load excessively large, it is possible to arbitrarily increase the data processing capability by gradually increasing the number of ISs or BSs (computers 4, 5 and 6) which are connected, so as to avoid an excessively large load. In addition, since the mirror GR is provided with respect to the main GR and this mirror GR is put in the hot standby state, it is possible to continue the communication management control by the mirror GR without interruption, immediately upon a failure occurring in the main GR.

(2) The operation of the IS includes the following basic steps (2-1) and (2-2) when the IS is realized by the computer shown in FIG. 3. The processes of the steps (2-1) and (2-2) are carried out by the CPU 101.

Figure 7:
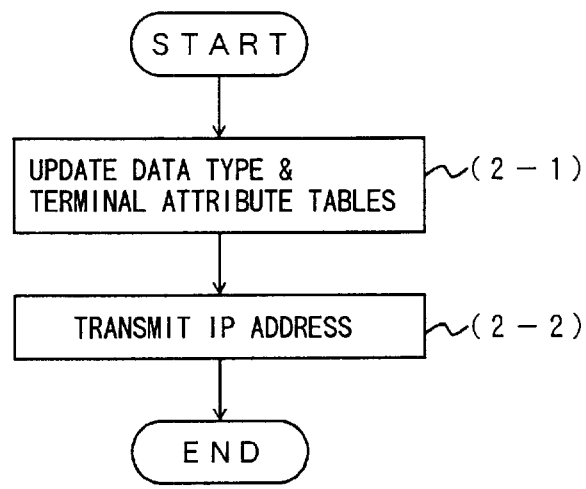
FIG. 7 is a flow chart for explaining the operation of the IS when receiving a transmission request from the GR.

FIG. 7 is a flow chart for explaining the operation of the IS when receiving a transmission request from the GR.

Step (2-1), FIG. 7: The head office IS has an IS data type table- shown in FIG. 2(*f*) and an IS terminal attribute table shown in FIG. 2(*c*). When an on-line task is started, the GR updates the IS data type table and the IS terminal attribute table by downloading a GR data type table shown in FIG. 2(*f*) and the GR terminal attribute table shown in FIG. 2(*c*), so that the IS data type table matches the GR data type table and the IS terminal attribute table matches the GR terminal attribute table.

Step (2-2), FIG. 7: The IS obtains the IP address of each terminal ID from the IS terminal attribute table which is updated from the GR, and transmits the IP address to a default gateway which is the router 8 in this case. If this default gateway is another sub network, the IP address is transferred to this other sub network to make the transmission or reception request.

Therefore, the IS which receives the transmission request from the GR for every terminal ID makes a reference to the IS terminal attribute table shown in FIG. 2(c) and the IS data type table shown in FIG. 2(f) which respectively match the. GR terminal attribute table and the GR data type table of the GR due to the downloading made from the GR. The IS obtains the IP address from the IS terminal attribute table, and transmits data (packet) to the second LAN 7 by setting the IP address in the data (packet). As a result, the IS which receives the transmission request from the GR can transmit the data (packet) having the IP address set therein to each of the terminals 11.

(3) The operation of the BS includes the following basic steps, (3-1) and (3-2) when the BS is realized by the computer shown in FIG. 3. The processes of the steps (3-1) and (3-2) are carried out by the CPU 101.

Figure 8:
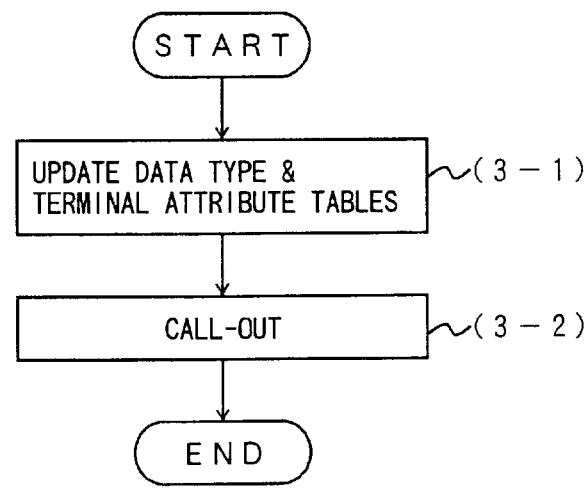
FIG. 8 is a flow chart for explaining the operation of the BS when receiving a transmission request from the GR.

FIG. 8 is a flow chart for explaining the operation of the BS when receiving a transmission request from the GR.

Step (3-1), FIG. 8: The head office BS includes a BS data type table shown in FIG. 2(f) and a BS terminal attribute table shown in FIG. 2(c). When the on-line task is started, the GR updates the BS data type table and the BS terminal attribute table by downloading the GR data type table shown in FIG. 2(f) and the GR terminal attribute table shown in FIG. 2(c). so that the BS data type table matches the GR data type table and the BS terminal attribute table matches the GR terminal attribute table.

Step (3-2), FIG. 8: Based on the telephone number and the JCA information of each terminal ID in the BS terminal attribute table which is updated from the GR, the BS makes a call-out with respect to the terminals 15 via the modem/TA 12 in conformance with a BSC procedure. In this case, it is possible to carry out a control with respect to two lines for every BS.

Therefore, the BS which receives the transmission request from the GR for every terminal ID makes a reference to the BS terminal attribute table shown in FIG. 2(c) and the BS data type table shown in FIG. 2(f), which respectively match the GR terminal attribute table and the GR data type table of the GR due to the downloading made from the GR. The BS obtains the telephone number and the JCA information from the BS terminal attribute table, and calls and transmits data to the terminals 15 based on the telephone number and the JCA information. As a result, the BS which receives the transmission request from the GR can call and transmit the data to each of the terminals 15 based on the telephone number and the like.

The functions of the IS and the BS are realized by the independent computers 4, 5 and 6 according to the description given above. However, as noted earlier, the functions of both the IS and the BS may be realized by a single computer.

(4) Next, a description will be given of the operation of the terminal 11. The operation of the terminal includes the following basic step (4-1) when the terminal 11 is realized by the computer shown in FIG. 3. The processes of the step (4-1) is carried out by the CPU 101.

Figure 9:
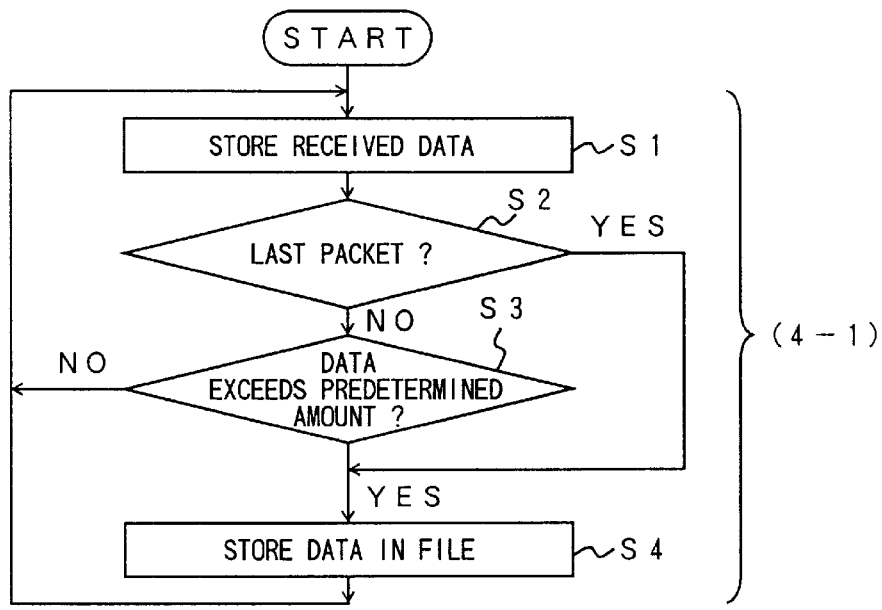
FIG. 9 is a flow chart for explaining the operation of a terminal on the store side when receiving data.

FIG. 9 is a flow chart for explaining the operation of the terminal 11 when receiving data from the IS.

Step (4-1), FIG. 9: The terminal 11 is an IS on the store side (hereinafter referred to as a store IS). Depending on the contents of the data type within the received data, the terminal 11 stores and registers the received data (packet), and returns a data reception result to the head office IS. In this case, the data type within the data received by the terminal 11 includes the data type defined for each store, such as the "master maintenance", and the received data (packet) is stored in an "item master", for example. The "item master" is also a kind of file generally used in the POS system or the like.

In FIG. 9, the basic step (4-1) includes steps S1 through S4. The step S1 stores the received data (packet) in the RAM 103, and the step S2 decides whether or not the received data (packet) is the last packet. If the decision result in the step S2 is NO, a step S3 decides whether or not an amount of data stored in the RAM 103 exceeds a predetermined amount, and the process returns to the step S1 if the decision result in the step S3 is NO. On the other hand, if the decision result in the step S2 or S3 is YES, the step S4 stores the data (packet) stored in the RAM 103 into the file specified by the data type, and the process returns to the step S1.

Therefore, the terminal 11, that is, the store IS, which receives the data (packet) from the head office IS, can carry out a process depending on the contents specified by the data type within the received data, such as registering the data in the "item master", and return the data reception result to the head office IS.

(5) A description will now be given of the operation of the terminal 15. The operation of the terminal 15 includes the following basic step (5-1) when the terminal 15 is realized by the computer shown in FIG. 3. The process of the step (5-1) is carried out by the CPU 101.

Figure 10:
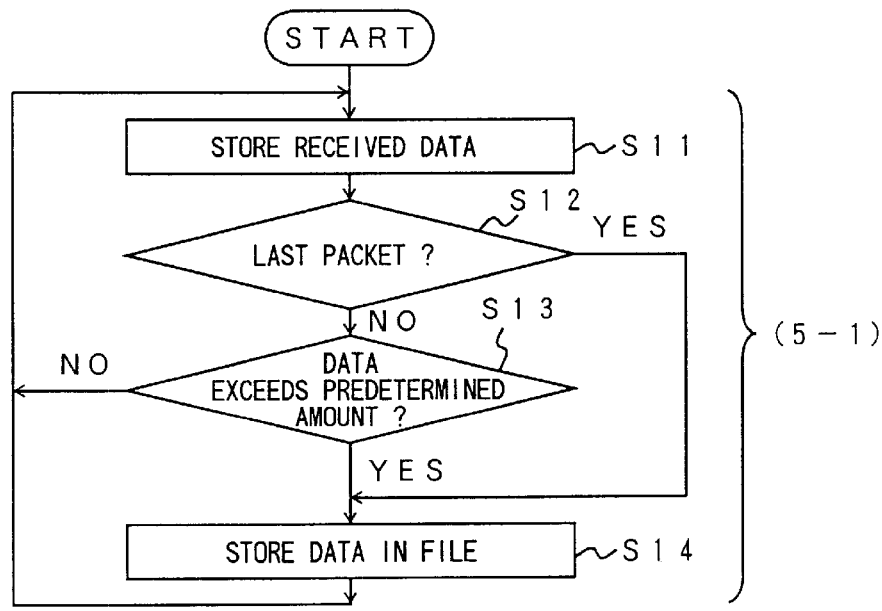
FIG. 10 is a flow chart for explaining the operation of a terminal on the head office side when receiving data.

FIG. 10 is a flow chart for explaining the operation of the terminal 15 when receiving data from the BS.

Step (5-1), FIG. 10: The terminal 15 is a BS on the store side (hereinafter referred to as a store BS). Depending on the contents of the data type within the received data, the terminal 15 stores and registers the received data in the "item master", for example, and returns a data reception result to the head office BS. In this case, the data type within the data received by the terminal 15 includes the data type defined for each store, such as the "master maintenance".

In FIG. 10, the basic step (5-1) includes steps S11 through S14. The step S11 stores the received data (packet) in the RAM 103, and the step S12 decides whether or not the received data (packet) is the last packet. If the decision result in the step S12 is NO, a step S13 decides whether or not an amount of data stored in the RAM 103 exceeds a predetermined amount, and the process returns to the step S11 if the decision result in the step S13 is NO. On the other hand, if the decision result in the step S12 or S13 is YES, the step S14 stores and registers the data (packet) stored in the RAM 103 into the file specified by the data type, and the process returns to the step S11.

Therefore, the terminal 15, that is, the store BS, which receives the data from the head office BS, can carry out a process depending on the contents specified by the data type within the received data, such as registering the data in the "item master", and return the data reception result to the head office BS.

A description will now be given of the tables shown in FIGS. 2(a) through 2(g).

FIG. 2(a) shows the GR system table of the GR shown in FIG. 1. This GR system table registers the following items, namely, the number of connected terminals (ISs), the line task transmission procedure used, the category indicating the existence of a mirror, and others. The number of connected terminals (ISs) indicates the number of connected computers 4 and 5, and the line task transmission procedure used indicates the transmission procedure of the data that is transmitted and received. The line task transmission procedure used is "0" for the procedure, "1" for the TCP/IP, and "2" for the BSC.

FIG. 2(b) shows the GR line attribute table of the GR shown in FIG. 1. This GR line attribute table registers the following items, namely, the line group code, the transmission procedure, the number of terminals used in units of line groups, the number of lines used in units of line groups, and others. The line group code indicates a line group by a code, and the transmission procedure indicates the procedure used for the transmission such as the TCP/IP.

FIG. 2(c) shows the GR, IS or BS terminal attribute table of the GR, IS or BS shown in FIG. 1. Registration to the IS and BS terminal attribute tables of the IS and BS is made in response to the downloading from the GR. Each of the GR, IS and BS terminal attribute tables registers the following items, namely, the terminal code, the IP address, the telephone number, the JCA information such as the center code and the station code, and others. The terminal code indicates one terminal 11 or 15, and the IP address one destination terminal 11. The telephone number is used to call the terminal 15, and the JCA information includes various kinds of information necessary to call a terminal.

FIG. 2(d) shows the GR terminal group table of the GR show in FIG. 1. The GR terminal group table registers the following items, namely, the terminal group code, the terminal code, and others. The terminal group code indicates a code (ID) of a group consisting of a plurality of terminals, and the terminal code indicates a code (ID) which determines one terminal.

FIG. 2(e) shows the GR common schedule table of the GR shown in FIG. 1. The GR common schedule table registers the following items, namely, the schedule number, the schedule type, the start and end times of the schedule, the terminal group code, the line group code, the number of lines used in units of schedules, the data type code, and others. The schedule number is the number of the schedule for which the transmission or reception request is received by the GR, and which number is requested to the IS/BS. The schedule type indicates the type of the schedule, such as whether or not it relates to the reception of the call from the host side. The start and end times of the schedule indicate the scheduled start time of the schedule and the end time of the schedule. The line group code is a code indicating the scheduled line group. The data type code indicates the type of data, and is a code indicating the "master maintenance" of the terminal, for example.

FIG. 2(f) shows the GR, IS or BS data type table of the GR, IS or BS shown in FIG. 1. Registration to the IS and BS data type tables of the IS and BS is made in response to the downloading from the GR. Each of the GR, IS and BS data type tables registers the following items, namely, the data type code, the data format, the distribution file name, the GR main common name, the GR mirror common name, and others. The data type code indicates the type of data such as the "master maintenance", and the data format indicates whether the data has a text format or a binary format. The data format is "0" for the text format, and is "1" for the binary format. The distribution file name indicates the file name that is used when distributing the file. The main GR common name indicates the name of the main GR, that is, the communication control unit 1. The mirror GR common name indicates the name of the mirror GR, that is, the communication control unit 2.

FIG. 2(g) shows an IS basic information table of the head office IS and the store IS (on the terminal side) shown in FIG. 1. The IS basic information table registers the following items, namely, the IS classification, the classification on the existence of a mirror, the main GR IP address, the mirror GR IP address, the host IS information, the terminal IS information, and others. The IS classification indicates the classification of the IS, that is, whether the IS is the host unit on the head office side or the terminal on the store side (terminal side). The IS classification is "0" for the host unit, and is "1" for the terminal. The classification on the existence of the mirror indicates whether or not a mirror GR of a sub system exists. The main GR IP address indicates the IP address of the main GR, that is, the communication control unit 1. The mirror GR IP address indicates the IP address of the mirror GR, that is, the communication control unit 2. The host IS information indicates information related to the IS on the host side, that is, the head office IS. The terminal IS information indicates information related to the IS on the terminal side, that is, the store IS.

Figure 11:
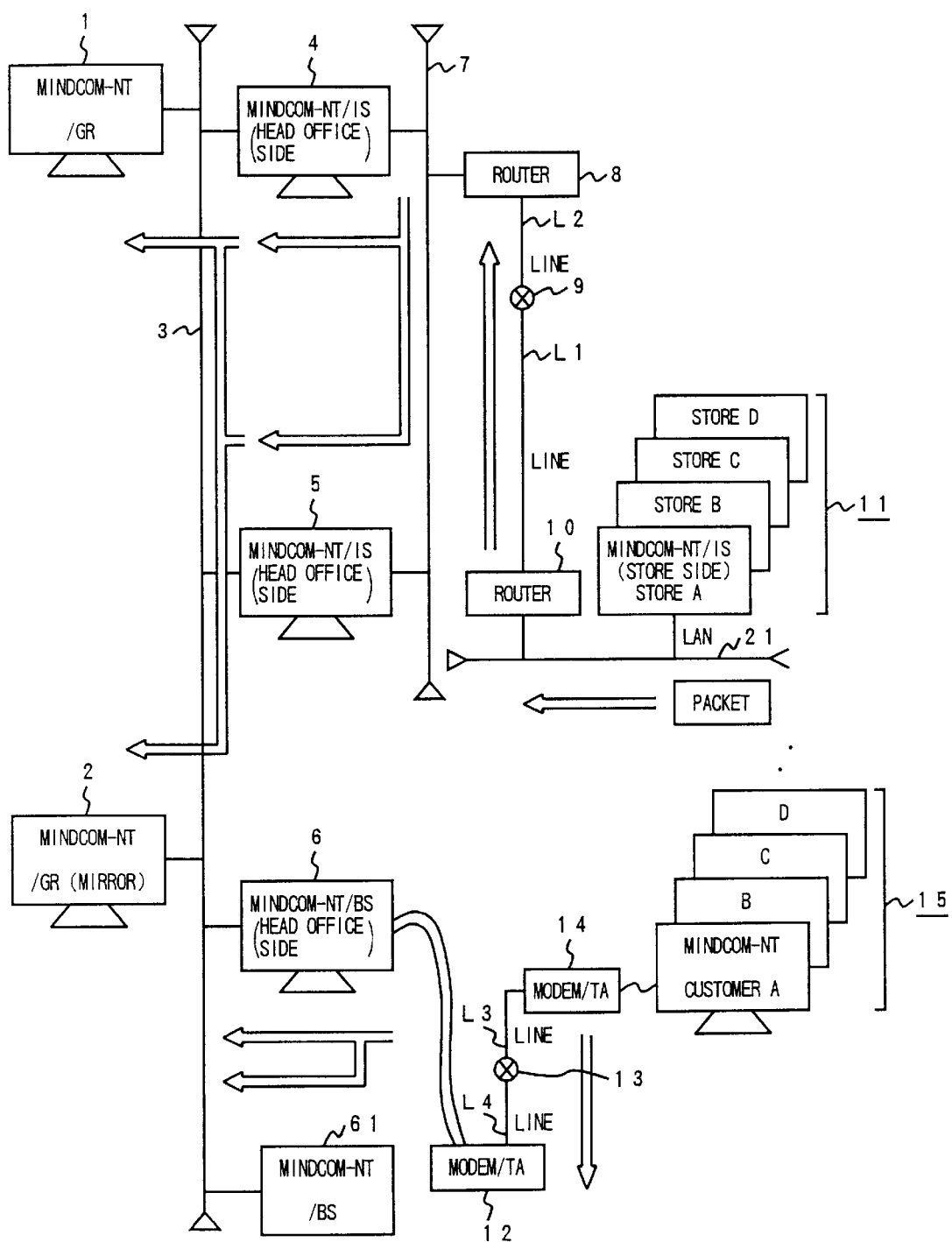
FIG. 11 is a system block diagram showing a second embodiment of a communication management control system according to the present invention.

Next, a description will be given of a second embodiment of the communication management control system according to the present invention, by referring to FIGS. 11, 12(a), 12(b) and 2(a) through 2(g). FIG. 11 shows the second embodiment of the communication management control system, and FIGS. 12(a) and 12(b) show tables used in this embodiment. This embodiment of the communication management control system employs a second embodiment of the communication control unit according to the present invention. In FIG. 11, those parts which are the same as those corresponding parts in FIG. 1 are designated by the same reference numerals.

For the sake of convenience, a description will be given of the operation of this embodiment for a case where the terminals 11 and 15 provided on the store side transmit data to the computers 4 through 6 and the communication control units 1 and 2.

The communication control units 1 and 2, the first LAN 3, the computers 4 through 6, the second LAN 7, the router 8, the network 9, the router 10, the terminals 11, the modem/TA 12, the network 13, the modem/TA 14, and the terminals 15 shown in FIG. 11 are identical to and have the same functions as those corresponding parts shown in FIG. 1, and a description thereof will be omitted.

The operation of this embodiment will be described with respect to first and second routes in which the data (packet) is transmitted as indicated by arrows in FIG. 11. The first route includes the terminals 11, the LAN 21, the router 10, a line L1, the network 9, a line L2, the router 8, the second LAN 7, the computers 4 and 5, and the communication control units 1 and 2. On the other hand, the second route includes the terminals 15, the modem/TA 14, a line L3, the network 13, a line L4, the modem/TA 12, the computer 6, the first LAN 3, and the communication control units 1 and 2.

In the following description, "GR" refers to the communication control unit 1 shown in FIG. 11 during a normal operation or the communication control unit 2 shown in FIG. 11 when a failure is generated in the communication control unit 1, and "mirror GR" refers to the communication control unit 2 shown in FIG. 11. In addition, "IS" refers to the computers 4 and 5 shown in FIG. 11, and "BS" refers to the computers 6 and 61 shown in FIG. 11.

In addition, a reference to the tables shown in FIGS. 2(a) through 2(g), 12(a) and 12(b) is made in the following manner. For example, "an IS data type table shown in FIG. 2(f)" refers to an IS data type table shown in FIG. 2(f) of the computers 4 and 5 shown in FIG. 11.

[1] The operation of the store IS, that is, the terminal 11, includes the following basic steps [1-2] and [1-2] when the terminal 11 is realized by the computer shown in FIG. 3. The process of the steps [1-2] and [1-2] are carried out by the CPU 101.

Figure 13:
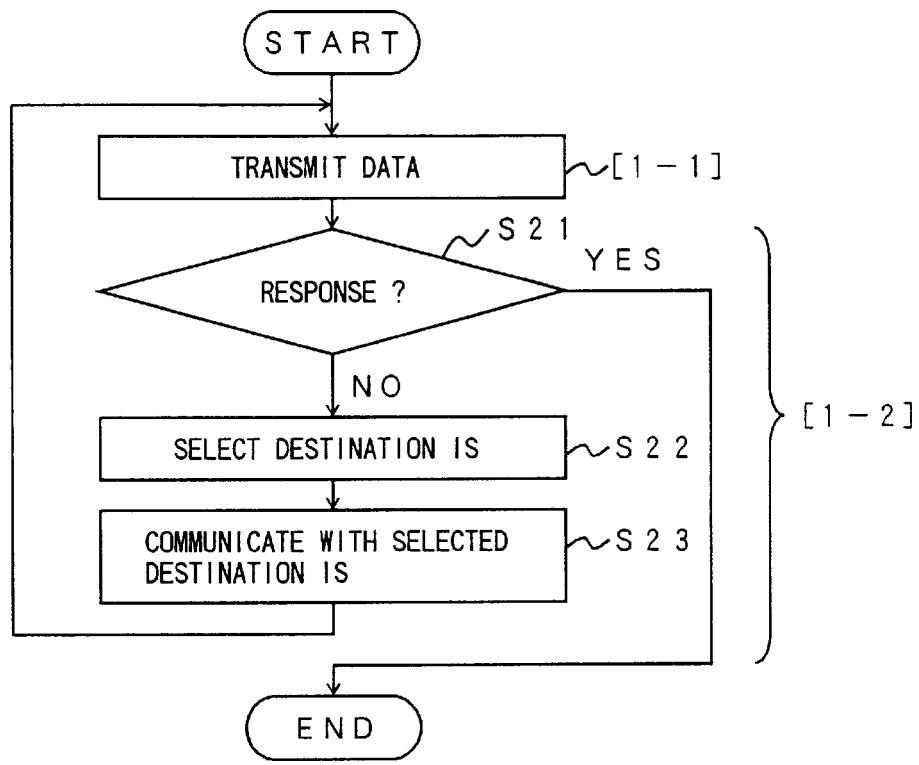
FIG. 13 is a flow chart for explaining the operation of a terminal on the store side when transmitting data.

FIG. 13 is a flow chart for explaining the operation of the terminal 11 when transmitting data.

Step [1-1], FIG. 13: The store IS transmits the data (packet) to a default gateway depending on the IS data type table shown in FIG. 2(f) and an IS host information table shown in FIG. 12(a).

Step [1-2], FIG. 13: If a failure or the like occurs in the head office IS and a response cannot be received from the head office IS even after a predetermined time elapses from the transmission of the data (packet) in the step [1-1], the store IS selects a destination head office IS according to the order of the destination head office ISs written under the IS information of the IS host information table shown in FIG. 12(a), and communicates with the selected destination head office IS which is connectable.

In FIG. 13, the basic step [1-2] includes steps S21 through S23. The step S21 decides whether or not a response is received from the head office IS within the predetermined time from the transmission of the data (packet) in the step [1-1], and the process ends if the decision result in the step S21 is YES. On the other hand, if the decision result in the step S21 is NO, a step S22 selects the destination head office IS according to the order of the destination head office ISs written under the IS information of the IS host information table shown in FIG. 12(a). In addition, the step S23 communicates with the destination head office IS selected in the step S22, and the process returns to the step [1-1] so as to transmit the data (packet) to the selected destination head office IS.

Therefore, when the store IS receives the data (packet) from the head office IS and transmits the processed result and the like in the form a data (packet), the store IS transmits the data (packet) to the default gateway (head office IS which receives the data (packet)) depending on the contents of the IS data type table shown in FIG. 2(f) and the IS host information table shown in FIG. 12(a). When no response is received from the head office IS, the store IS selects a destination head office IS according to the order of the destination head office ISs written under the IS information of the IS host information table shown in FIG. 12(a), and transmits the data (packet) to the selected destination head office IS which is connectable. As a result, even if a failure is generated in the head office IS which transmits the data to the store IS, another head office IS such as the computers 4 and 5 automatically receives the data as a substitute, thereby maintaining continuity of the process.

[2] The operation of the host IS, that is, the computer 4 or 5, includes the following basic step [2-1] when the computer 4 or 5 is realized by the computer shown in FIG. 3. The process of the step [2-1] is carried out by the CPU 101.

Figure 14:
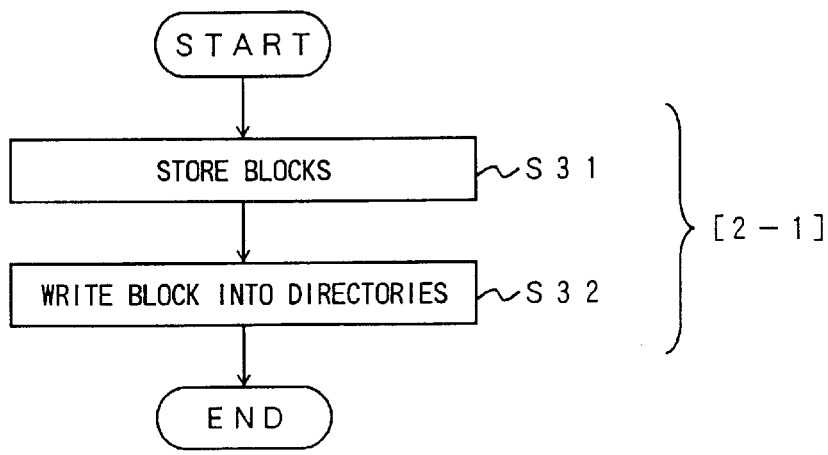
FIG. 14 is a flow chart for explaining the operation of a computer when receiving data.

FIG. 14 is a flow chart for explaining the operation of the computer 4 or 5 when receiving data.

Step [2-1],-FIG. 14: The head office IS temporarily stores the data (packets), received in divisions, in blocks having the size of the distribution file size of the control packet shown in FIG. 12(b) which is transmitted from the store IS. The control packet is used for the communication between applications of the store IS and the head office IS. In addition, the head office IS writes the blocks into directories of the GR data type table shown in FIG. 2(f) of the GR and the mirror GR in one operation.

In FIG. 14, the basic step [2-1] includes steps S31 and S32. The step S31 stores the data (packets) in blocks into the RAM 103, and the step S32 writes the blocks into the directories of the GR data type table of the GR and mirror GR.

Therefore, when the head office IS receives the data from the store IS, the data are accumulated into predetermined sizes and are written into predetermined directories in one operation. As a result, the head office IS which receives a large number of data having small sizes from the store IS accumulates the data into predetermined sizes and writes the data having the predetermined sizes into the predetermined directories of the GRs, that is, the communication control units 1 and 2, via the first LAN 3 in one operation. Accordingly, the number of packets transmitted within the first LAN 3 is reduced, thereby making it possible to reduce the overhead.

[3] The operation of the GRs, that is, the communication control units 1 and 2, includes the following basic step [3-1] when the communication control unit 1 or 2 is realized by the computer shown in FIG. 3. The process:of the step [3-1] is carried out by the CPU 101.

Figure 15:
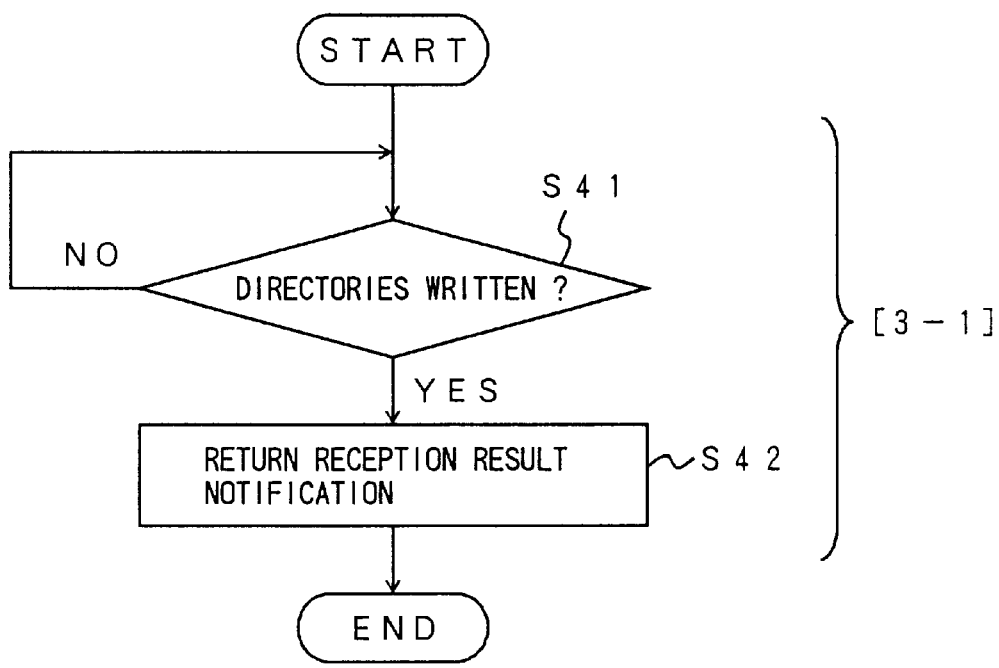
FIG. 15 is a flow chart for explaining the operation of a communication control unit when receiving data.

FIG. 15 is a flow chart for explaining the operation of the communication control unit 1 or 2 when receiving data.

Step [3-1],FIG. 15: After the received file is written by the head office IS, that is, after the received file is written into the directories of the GR data type tables shown in FIG. 2(f) of the, GR and the mirror GR in one operation, the GR returns a reception result notification to the store IS via the head office IS by the control packet (control message).

In FIG. 15, the basic step [3-1] includes steps S41 and S42. The step S41 decides whether or not the received file is written into the directories of the GR data type tables of the GR and mirror GR. If the decision result in the step S41 becomes YES, a step S42 returns the reception result notification to the store IS by the control packet (control message).

Therefore, the store IS can confirm that all of the data which are divided and transmitted in packets are received by the GR. If it is not possible to confirm the receipt of the data by the GR within a predetermined time, the store IS at the transmitting source makes a reference to the IS host information table shown in FIG. 12(a) and selects a destination head office IS according to the order of the destination head office ISs written under the IS information, and transmits the packet to the selected destination head office IS which is connectable, as described above.

[4] The store MINDCOM-NT that is, the terminal 15 on the store side, operates similarly to the store IS, that is, the terminal 11 on the store side, as when the store IS transmits the packets to the head office IS such as the computers 4 and 5 via the router 10, the network 9, the router 8 and the second LAN 7. In other words, the terminal 15 transmits the data to the head office IS, that is, the computer 6, via the modem/TA 14, the network 13 and the modem/TA 12. In this state, although the store IS (terminal 11) transmits the packet by setting the IP address in the packet, the store MINDCOM-NT (terminal 15) calls the telephone number of the head office IS (computer 6) and connects to a line and transmits the data in a state where the line is connected. In addition, the head office IS (computer 6) writes the received files in the predetermined directories of the GRs (communication control units 1 and 2) in one operation, similarly to the operation described above under [2].

A description will now be given of the tables shown in FIGS. 12(a) and 12(b).

FIG. 12(a) shows the IS host information table of the store IS (terminal 11) shown in FIG. 11. This IS host information table registers the following items, namely, the number of ISs, the IS information, the IS number, the IP address, and others. The number of ISs indicates the number of head office ISs of the line group to which the store IS belongs. For example, in the case of the store IS (terminal 11) shown in FIG. 11, the number of ISs is two (computers 4 and 5). The IS information relates to a pair formed by the IS number of the head office IS and the IP address of the head office IS, and twelve pairs can be registered in this embodiment. Hence, by registering the IS host information table in the store IS, it is possible to make another head office IS, such as the computers 4 and 5 successively transmit and receive the data as a substitute, if a failure is generated in the head office IS or no response is received from the head office IS when the store side IS (terminal 11) which receives the packets from the head office IS transmits the processed result to the head office IS.

FIG. 12(b) shows the control packet, that is, the packet (or control message) used to exchange control information between the application of the store IS (terminal 11) and the head office IS (computer 4 or 5). This control packet registers the following items, namely, the sequence number, the distribution classification, the terminal code, the data type, the distribution file size, the result code, and others. The sequence number indicates one control packet, and the distribution classification indicates the classification of the distribution. The terminal code indicates the store IS, and the data type indicates the type of data such as the "master maintenance". The distribution file size indicates the size with which the head office IS writes the data received from the store IS in the directories of the GR in one operation. The result code indicates the result of the packet reception or the like. The application of the store IS (terminal 11) and the application of the head office IS (computer 4 or 5) exchange the control information using the control packet, so as to control the exchange of the data.

According to the embodiments described above, inexpensive terminals such as the computers 4, 5 and 6 are used, and the main and sub communication control units 1 and 2 which control the communication with the terminals are connected to the first LAN 3 which provides the data processing service. In addition, the computers 4 and 5 are connected to the first LAN 3 and the data are exchanged with a large number of terminals 11 via the second LAN 7, and the computer 6 is connected to the first LAN 3 and the data are exchanged with a large number of terminals 15 via the modem/TA 12 and the lines L3 and L4. For this reason, the number of communication control units 1 and 2 and the computers 4 through 6 which are connected can be increased in the communication management control system depending on the number of terminals or the amount of data processing, so as to flexibly cope with the conditions at a low cost. Hence, even if a failure is generated in one or more computers within the communication management control system, it is possible to continue the communication process by a computer which is operating normally.

Further, the present invention is not limited to these embodiments, but various variations and modifications may be made without departing from the scope of the present invention.

What is claimed is:

1. A communication management control system which manages exchange of data between an external information processing unit and an internal information processing unit via a router, comprising:
   a first local area network (LAN) coupled to the internal information processing unit;
   a first communication control unit and a plurality of second communication control units; and
   a second local area network (LAN) coupled to the router and directly coupled to said second communication control units;
   said first communication control unit being coupled to said first LAN, each of said second communication control units being directly coupled to both said first LAN and said second LAN,
   the data being received by said first communication control unit from said internal information processing unit and selectively distributed to one or more of said second communication control units.

2. The communication management control system as claimed in claim 1, wherein said second communication control units include means for temporarily storing a predetermined amount of data received via said second LAN.

3. The communication management control system as claimed in claim 1, wherein said first communication control unit comprises:
   coupling means for further coupling said first communication control unit to the external information processing unit;
   a storage unit storing information used to couple said first communication control unit to the external information processing unit; and
   means for transmitting data to the external information processing unit via said coupling means based on the information stored in said storage unit in response to a data transmission request requesting a data transmission from the internal information processing unit to the external information processing unit.

4. The communication management control system as claimed in claim 3, wherein said data transmission request specifies a file which stores the data to be transmitted.

5. A communication control unit which exchanges data between an external information processing unit and an internal information processing unit via a router, said internal information processing unit being provided within a communication management control system having a first local area network (LAN) which provides a data processing service and a second local area network (LAN) which is coupled to the router and provides a communication service, said communication control unit comprising:
   a first controller;
   a plurality of second controllers;
   first means for coupling the first controller to the internal information processing unit and the first LAN; and
   second means for directly coupling each of the second controllers to both the second LAN and the first LAN, the data being received by said first controller from said internal information processing unit and selectively distributed to one or more of said second controllers.

6. The communication control unit as claimed in claim 5, which further comprises: buffer means for temporarily storing a predetermined amount of data received via the second LAN; and means for transmitting the data stored in said buffer means to the first LAN.

7. A computer program product which stores a program for causing an exchange of data between an external information processing unit and an internal information processing unit via a router, said internal information processing unit being provided within a communication management control system having a first local area network (LAN) which provides a data processing service and a second local area network (LAN) which is coupled to the router and provides a communication service, said computer program product comprising:

a first controller;

a plurality of second controllers;

first means for coupling the first controller to the internal information processing unit and the first LAN; and second means for directly coupling each of the second controllers to both the second LAN and the first LAN, the data being received by said first controller from said internal information processing unit and selectively distributed to one or more of said second controllers.

8. The computer program product as claimed in claim 7, which further comprises:

buffer means for temporarily storing a predetermined amount of data received via the second LAN; and means for transmitting the data stored by said buffer means to the first LAN.

9. The computer program as claimed in claim 7 controlling the computer to exchange data, further by:

causing buffer means to temporarily store a predetermined amount of data received by the second LAN; and causing said buffer means to transmit the stored data by said buffer means to the first LAN.

10. A computer program controlling an exchange of data between internal and external information processing units via a router, in a system having a first local area network (LAN) coupled to a first communication control unit and providing a data processing service and a second local area network (LAN), coupled to the router and providing a communication service, by:

causing the internal information processing unit to couple to the first LAN;

causing a plurality of second communication control units each to be directly coupled to the first LAN and directly coupled to the second LAN; and causing the data being received by said first communication control unit from said internal information processing unit and selectively distributed to one or more of said second communication control units.

11. A system to exchange data between an external information processing unit and an internal information processing unit, comprising:

a first local area network (LAN) coupled to the internal information processing unit;

a second LAN in communication with the external information processing unit;

a first communication control unit coupled to said first LAN; and a plurality of second communication control units each directly coupled to both said first LAN and said second LAN.

12. The system as claimed in claim 11, further comprising a plurality of second communication control units, wherein said first communication control unit allocates data received from said internal information processing unit to said second communication control units, and distributes a load on said second communication control units.

\* \* \* \* \*

UNITED STATES PATENT AND TRADEMARK OFFICE
CERTIFICATE OF CORRECTION

PATENT NO.    : 6,687,221 B1  Page 1 of 1
DATED         : February 3, 2004
INVENTOR(S)   : Osamu Kurose et al.

It is certified that error appears in the above-identified patent and that said Letters Patent is hereby corrected as shown below:

<u>Column 14,</u>
Line 11, begin a new paragraph with "each of said second".

Signed and Sealed this

Fifteenth Day of June, 2004

JON W. DUDAS
*Acting Director of the United States Patent and Trademark Office*